US008318300B2

(12) United States Patent
Schiraldi et al.

(10) Patent No.: US 8,318,300 B2
(45) Date of Patent: Nov. 27, 2012

(54) DIFFUSION BARRIER FOR ELECTRONIC DISPLAY DEVICES

(75) Inventors: David Schiraldi, Shaker Heights, OH (US); Mohit Gupta, Cleveland Heights, OH (US)

(73) Assignee: Case Western Reserve University, Cleveland, OH (US)

( * ) Notice: Subject to any disclaimer, the term of this patent is extended or adjusted under 35 U.S.C. 154(b) by 500 days.

(21) Appl. No.: 12/543,211

(22) Filed: Aug. 18, 2009

(65) Prior Publication Data

US 2010/0047558 A1 Feb. 25, 2010

Related U.S. Application Data

(60) Provisional application No. 61/090,066, filed on Aug. 19, 2008.

(51) Int. Cl.
*B32B 17/00* (2006.01)

(52) U.S. Cl. ......... 428/325; 428/323; 428/331; 428/426

(58) Field of Classification Search .................. 428/325, 428/323, 331, 426
See application file for complete search history.

(56) References Cited

U.S. PATENT DOCUMENTS

2007/0059519 A1* 3/2007 McCulloch et al. .......... 428/331

OTHER PUBLICATIONS

Guschl et al., Experimental observation and prediction of interfacial tension and viscoelastic emulsion model behavior in novel phosphate glass-polymer hybrids, 2003, Elsevier Inc., Journal of Colloid and Interface Science, 266, pp. 82-92.*

* cited by examiner

*Primary Examiner* — Elizabeth A Robinson
(74) *Attorney, Agent, or Firm* — Tarolli, Sundheim, Covell & Tummino LLP

(57) ABSTRACT

A barrier structure includes a composite film. The composite film includes a polymer matrix and a plurality of dispersed high aspect ratio glass particles within the polymer matrix.

3 Claims, 10 Drawing Sheets

Melt Pump A
AB Feedblock
Extruder A
Extruder B
Melt Pump B
Layer Multipliers
Exit Die
Microlayers
Simultaneous biaxial stretching

20
A 34
10
20
B 22
28
32
24
34

20
30
10
26

DIFFUSION BARRIER FOR ELECTRONIC DISPLAY DEVICES

RELATED APPLICATION

This application claims priority from U.S. Provisional Application No. 61/090,066, filed Aug. 19, 2008, the subject matter of which is incorporated herein by reference in its entirety.

TECHNICAL FIELD

The present invention relates to barrier structures and, in particular, relates to a method and apparatus for inhibiting gas diffusion.

BACKGROUND OF THE INVENTION

There is great interest in the development of polymers with a high barrier to oxygen, carbon dioxide, water, or organic vapors for use in the packaging industry. Various approaches have been taken to improve the barrier properties of polymeric substrates. One most commonly used involves coating an inorganic layer on the top of polymer substrate. The formation of defects in the coating, however, like pin holes or crazes, lead to the formation of a diffusion pathway, thus ruining the barrier properties over time. The incorporation of solid inorganic fillers to improve gas barrier properties of polymers has also been widely used. Incorporating such fillers in large amounts, however, complicates processing due to the inherent increase in melt viscosity. The incorporation also often leads to a loss of optical transparency.

SUMMARY OF THE INVENTION

The present invention relates to a barrier structure for inhibiting diffusion of gas. The barrier structure comprises a composite film, which includes a polymer matrix and a plurality of dispersed high aspect ratio glass particles within the polymer matrix.

In an aspect of the invention, the polymer matrix can include a polymeric material selected from the group consisting of PET, PPgMA, acrylics/methacrylics, polyesters, polyurethanes, polyamides, polyimides, polyphosphazenes, epoxy resins, hybrid polyester polymers, nanocomposite polyester polymers, nylon and combinations thereof.

In another aspect of the invention, the glass can have a glass transition temperature (Tg) that is less than the melting temperature (Tm) of the polymer matrix. For example, the glass can have a Tg of about 90° C. to about 116° C.

In another aspect of the invention, the glass particles can be inorganic, elongated, and/or inhibit gas diffusion through the composite film. For example, the glass particles can be selected from the group consisting of $P_2O_5$, SnO, $SnF_2$ or combinations thereof. In another example, the glass particles comprise about 30% to about 40% $P_2O_5$, about 5% to about 20% SnO and about 50% to about 60% $SnF_2$.

In another aspect of the invention, the barrier can include a stack of alternating polymer layers and composite layers. The composite layers and polymer layers can form the composite film.

The present invention also relates to a barrier structure that comprises a composite film that includes alternating stacked composite layers and polymer layers. Each of the composite layers includes a polymer matrix and a plurality of high aspect ratio glass particles dispersed within the polymer matrix. The glass particles can inhibit gas diffusion through the composite film.

Another aspect of the invention relates to a method of forming a barrier structure. In the method, a composite film that includes a polymer matrix and a plurality of dispersed glass particles within the polymer matrix is provided. The glass can have a Tg that is less than the Tm of the polymer matrix. The composite film is biaxially oriented at a temperature above the Tg of the glass particles and below the Tm of the polymer matrix.

In another aspect of the invention, biaxial orientation of the composite film causes the glass particles to be axially deformed so that the glass particles more readily inhibit gas diffusion through the composite film. In another aspect of the invention, the composite film can be biaxially oriented by drawing the composite film at a draw ratio of about 3:3 to about 5:5. The drawing of the composite film can be performed at about 158° C.

The present invention further relates to a stack of alternating polymer layers and composite layers. The composite layers and polymer layers form a composite film. The polymer layers and composite layers are co-extruded.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIG. 10(*b*) is an SEM image of the composite film of FIG. 10(*a*) after biaxial orientation;

FIG. 10(*c*) is an SEM image of a 65 layer composite film having 10% by volume glass before biaxial orientation;

FIG. 10(*d*) is an SEM image of the composite film of FIG. 10(*c*) after biaxial orientation;

FIG. 10(*e*) is an SEM image of a 129 layer composite film having 10% by volume of glass before biaxial orientation;

FIG. 10(*f*) is an SEM image of the composite film of FIG. 10(*e*) after biaxial orientation;

DETAILED DESCRIPTION

Figure 1:
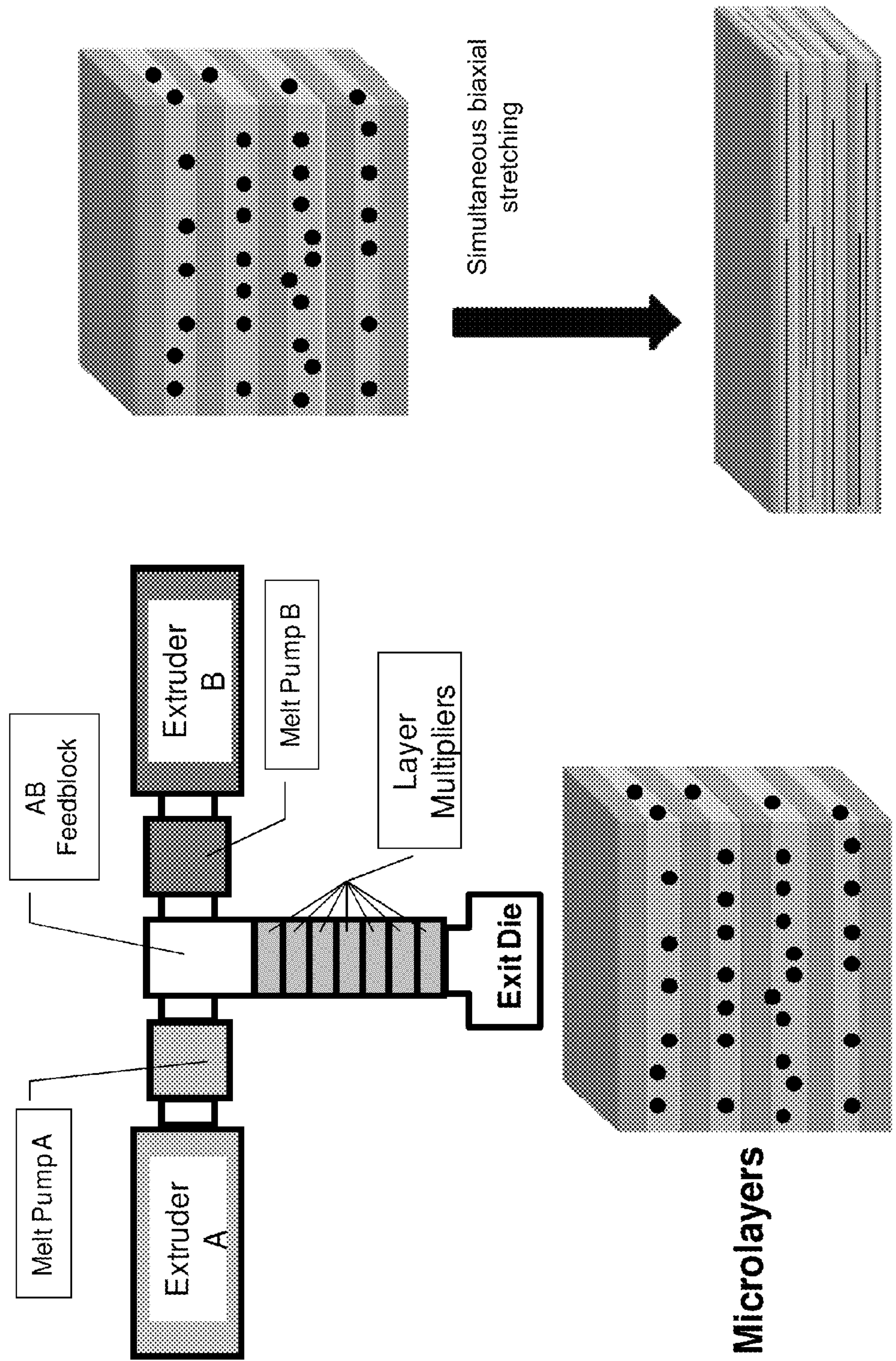
FIG. 1 is a schematic illustration of a method of forming a barrier structure in accordance with the present invention.

The present invention relates to barrier structures and, in particular, relates to a method and apparatus for inhibiting gas diffusion. The barrier structure comprises a composite film that can include a composite layer. The composite layer can include a polymer matrix and a plurality of high aspect ratio glass particles dispersed within the polymer matrix. The glass particles can inhibit gas diffusion through the composite film.

The barrier structure is thermoformable and reshapable and has barrier properties that allow it to be used as a barrier in electronic display applications. In an aspect of the invention, the composite layer can be formed, for example, by extruding a melt of a polymeric material and a low glass transition temperature/high oxygen barrier inorganic glass. The composite layer can include a polymer matrix that encapsulates and contains particles of the glass. The resulting extruded composite layer can form a composite film, which can be biaxially oriented above the glass transition temperature ($T_g$) of the glass particles but below the melting temperature ($T_m$) of the polymer material. Biaxial orientation within this temperature range deforms the glass particles into high aspect ratio disc-shapes or platelets that can create a highly tortuous gas diffusion path within the composite film and the barrier structure.

The polymeric material used to form the polymer matrix of the composite layer can be an organic polymer that has a $T_m$ higher than the $T_g$ of the glass particles. Examples of polymeric materials that can be used to form the composite layer include, maleic anhydride-modified polypropylene (PPgMA); polyethylene naphthalate and isomers thereof such as 2,6-, 1,4-, 1,5-, 2,7-, and 2,3-polyethylene naphthalate; polyalkylene terephthalates such as polyethylene terephthalate, polybutylene terephthalate, and poly-1,4-cyclohexanedimethylene terephthalate; polyimides such as polyacrylic imides; polyetherimides; styrenic polymers such as atactic, isotactic and syndiotactic polystyrene, α-methyl-polystyrene, para-methyl-polystyrene; polycarbonates such as bisphenol-A-polycarbonate (PC); poly(meth)acrylates such as poly(isobutyl methacrylate), poly(propyl methacrylate), poly(ethyl methacrylate), poly(methyl methacrylate), poly(butyl acrylate) and poly(methyl acrylate) (the term “(meth)acrylate” is used herein to denote acrylate or methacrylate); cellulose derivatives such as ethyl cellulose, cellulose acetate, cellulose propionate, cellulose acetate butyrate, and cellulose nitrate; polyalkylene polymers such as polyethylene, polypropylene, polybutylene, polyisobutylene, and poly(4-methyl)pentene; fluorinated polymers such as perfluoroalkoxy resins, polytetrafluoroethylene, fluorinated ethylene-propylene copolymers, polyvinylidene fluoride, and polychlorotrifluoroethylene and copolymers thereof; chlorinated polymers such as polydichlorostyrene, polyvinylidene chloride and polyvinylchloride; polysulfones; polyethersulfones; polyacrylonitrile; polyamides; polyvinylacetate; polyether-amides.

Polymeric material used to form the polymer matrix can also be copolymers, such as styrene-acrylonitrile copolymer (SAN), preferably containing between about 10 and about 50 wt %, preferably between about 20 and about 40 wt %, acrylonitrile, styrene-ethylene copolymer; and poly(ethylene-1, 4-cyclohexylenedimethylene terephthalate) (PETG). Additional polymeric materials can include an acrylic rubber; isoprene (IR); isobutylene-isoprene (IIR); butadiene rubber (BR); butadiene-styrene-vinyl pyridine (PSBR); butyl rubber; polyethylene; chloroprene (CR); epichlorohydrin rubber; ethylene-propylene (EPM); ethylene-propylene-diene (EPDM); nitrile-butadiene (NBR); polyisoprene; silicon rubber; styrene-butadiene (SBR); nylon; and urethane rubber. Additional polymeric materials include block or graft copolymers.

In addition, the polymeric material may include blends of two or more of the above-described polymers or copolymers, preferably the components of the blend are substantially miscible, thus not affecting the transparency of the blend.

The glass particles can be formed from any inorganic glass material that has a $T_g$ less than the $T_m$ of the polymeric material and that inhibits diffusion of gas. Examples of inorganic glasses include $P_2O_5$, SnO, $SnF_2$, phosphate glasses, and combinations thereof. Alternative glass materials exhibiting properties similar to the aforementioned inorganic glasses are also contemplated within the spirit of the invention. The glass particles may be incorporated into the composite layer in any amount relative to the amount of polymer material used in the composite layer. For example, the glass particles may constitute about 5% by volume to about 90% by volume of the composite layer, although alternative volume percentages may be used.

Although the barrier structure can have a monolayer construction with a single composite layer, the barrier structure can include multiple composite layers as well as composite layers and polymer layers. By polymer layers it is meant layers of polymeric material, such as the polymeric materials described above, that are substantially free of the high aspect ratio glass particles of the composite layer.

In an aspect of the invention, the composite film can include stacked alternating composite layers and polymer layers. The composite layers and the polymer layers can be co-extruded to form a multilayer barrier structure. The number of layers depends on the application, and in principle, a single composite layer composite film gives enough barrier effect. By way of example, the barrier structure can include a few layers or up to several thousand layers. The thickness of the extruded polymer layers and composite layers used to form the barrier structure is theoretically unlimited and can be, for example, less than about 50 nm. The practical limit comes from the flow behavior of the materials and the interfacial tension.

Both the polymer layer and the composite layer are preferably solid at room temperature, e.g., about 25° C. For a good transparency, not only should the individual materials used to form the composite layers and/or polymer layers have a high transmittance of light, but also the refractive indices of the composite layers and polymer layers should be selected to reduce reflections at the interface between the polymer layers and composite layers. On the other hand, in cases where transparency is not required, it is possible to use polymer blends with fillers as a way to improve the viscosity matching and the mechanical properties of the final barrier. Blends of polymers with low melting glasses can be combined as a replacement for all composite layers and/or all polymer layers. The polymer layers and composite layers can also include additives, which improve the mechanical properties (e.g., adhesion to the glass particles) and other desired barrier properties.

The barrier structure may also include a plastic cover layer on one or both sides of the composite film for protection and as an appropriate interface to other components, which might be attached to the barrier structure in various applications.

The first step of forming a monolayer barrier structure comprising a composite film having a single composite layer includes mixing the polymeric material and the glass particles to form a composite material. The polymeric material and the glass particles may be mixed, for example, by batch mixing using rollers, and dried in a vacuum. The composite material can then be compression molded in elevated temperature conditions to form a composite film. The compressed composite film may have a thickness of, for example, about 10 mil. The composite film can then biaxially stretched or drawn at a draw temperature that is greater than the $T_g$ of the glass particles and less than the $T_m$ of the polymer using, for example, a Bruckner Karo IV biaxial stretcher. The composite film may be simultaneously and biaxially drawn to draw ratios varying from about 3:3 to about 5:5, although other draw ratios may be used.

Alternatively, as illustrated in FIG. 1, the composite film can include multiple alternating composite layers and polymer layers. The composite material can be formed as described above. The composite material can then be co-extruded with a neat polymeric material comprised of the aforementioned polymeric material(s) into alternating layers. The alternating layers can be multiplied as described below to form a microlayered composite film. The microlayered composite film may have several alternating layers or thousands of alternating layers. Regardless of the number of layers in the microlayered composite film, the glass particles in the composite layers are un-oriented and have no particular configuration. Following formation of the microlayered composite film, the microlayered composite film is biaxially stretched or drawn at a draw temperature that is greater than the $T_g$ of the glass particles but less than the $T_m$ of the polymer.

Regardless of the particular material chosen for the glass particles, the glass particles should exhibit a high aspect ratio following biaxial orientation during formation of either the monolayer or multilayered composite film barrier structure. When an object has a high aspect ratio, it is meant that one dimension of the object is substantially greater than another dimension of the object. In the present invention, for example, the glass particles may have a length that is substantially longer than the width, or vice versa. In aspect of the invention, the particles can be oriented in the composite layer such that length of each particle is substantially parallel to an outer surface of the composite film and/or substantially orthogonal to the direction of diffusion of gas through the barrier structure.

The ratio of the length to the width of the glass particles may be on the order of only about 2:1 or about 3:1. Alternatively, the ratio of the length to the width of the glass particles may be up to the order of about 1000:1 or higher. Those in the art will appreciate, however, that any dimension of the glass particle may be substantially greater than any other dimension of the glass particle such that the glass particle exhibits a high aspect ratio. It is this high aspect ratio that can create the highly tortuous path in the barrier structure for diffusing gasses.

When gas diffuses through a polymer substrate, the gas may begin to dissolve within the substrate during the diffusion process. By prolonging the diffusion process, the dissolving time of the gas within the substrate is increased, thereby increasing the likelihood that the gas will be completely dissolved within the substrate. In the present case, when the glass particles in the monolayer or microlayered composite film are elongated into platelet-shaped obstructions to diffusion, gas diffusing through the film must diffuse through a more tortuous path than if the glass particles were omitted. By creating a more tortuous diffusion path, the film construction of the present invention prolongs the dissolving time of the diffusing gas within the composite film and thereby advantageously reduces the permeability of the barrier structure.

Furthermore, whether the barrier structure consists of a monolayer composite film or a microlayered composite film, it can be advantageous to limit the rate at which the biaxial stretching is performed. For example, if the biaxial stretching is performed too rapidly, the shear stresses experienced by the composite film may be greater than the viscosity between the glass particles and the polymer. This may cause relative movement or slippage between the glass particles and the polymer during stretching that can result in reduced elongation of the glass particles, thereby increasing the gas permeability of the composite film.

It has been found that, following biaxial orientation, the glass platelets impart a modulus to the stretched composite film that is greater than the modulus of the un-stretched, un-oriented composite film. It has also been found that the optical transparency of the biaxially oriented composite films is not significantly compromised compared to un-stretched composite films. In fact, the light transmission through the stretched composite films decreases marginally with an increase in the volume percentage of Pglass in the composite film.

It has also been found that the relative humidity of the composite film affects the oxygen permeability of the composite film. Gas permeability is dictated by the ability of the polymer to dissolve the diffusant molecules and the mobility of the diffusant molecules in the polymer matrix. In the presence of humidity, water competes with the oxygen to fill up the holes of free volume within the composite film. This competition between the oxygen and the water for the limited number of free volume spaces decreases the solubility of the oxygen in the composite film. Therefore, oxygen solubility is a significant factor in determining oxygen permeability as a function of humidity. This may be illustrated, for example, by comparing the flux values through various microlayered PPgMA/Pglass composite films prepared in accordance with the present invention as shown in Table 1.

TABLE 1

| | Flux values (0% RH)/23° C./65 layer | Flux values (Conditioned 1 month 97% RH)/ 23° C./65 layer |
|---|---|---|
| PPgMA | 85.2/99.1 | 71.2/81.4 (16-18)% |
| PPgMA/Pglass 95/5 v/v | 23.2/24.5 | 16.5/18.2 (25-30)% |
| PPgMA/Pglass 90/10 v/v | 1.75/2.99 | 1.34/2.04 (25-30)% |
| PPgMA/Pglass 80/20 v/v | 0.41/0.48 | 0.35/0.38 (15-20)% |

Figure 2:
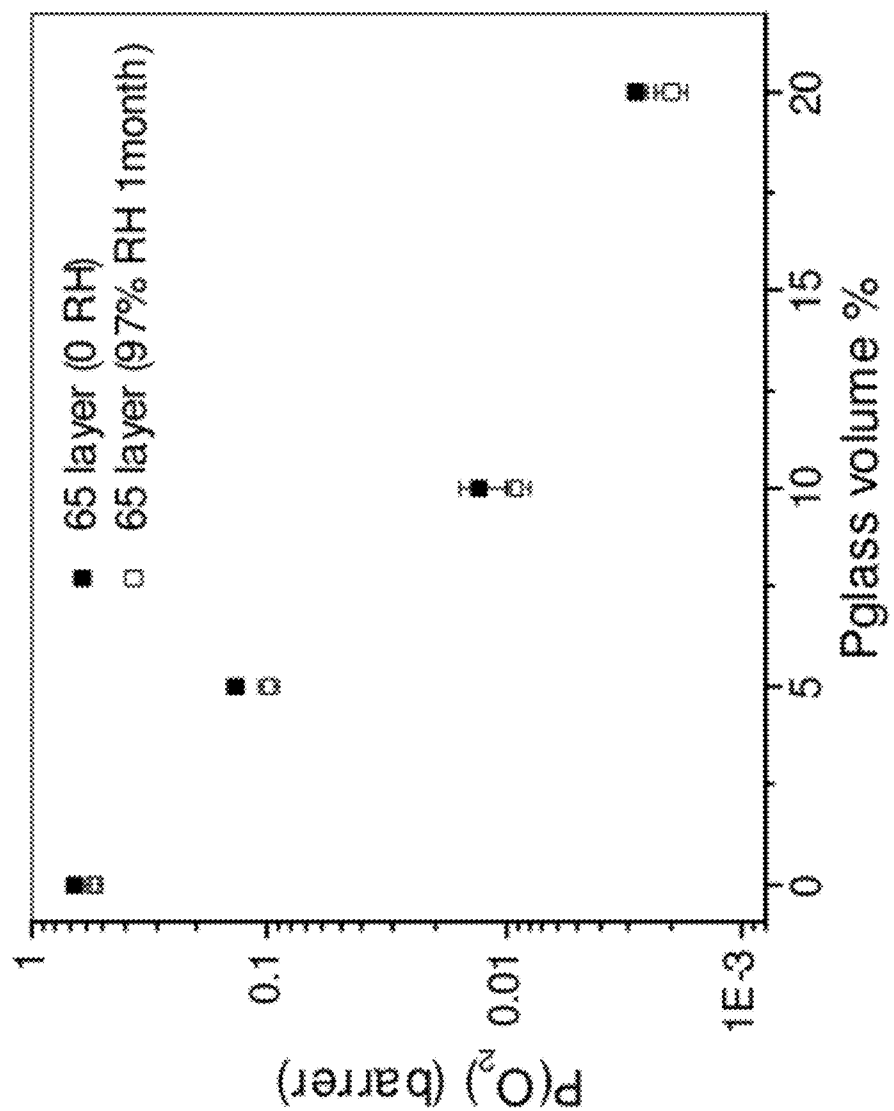
FIG. 2 is a graph illustrating the effect of humidity upon oxygen permeability in barrier structures.

As can further be shown in FIG. 2, the microlayered barrier structure has a lower barrier to oxygen permeability, i.e., allows for greater oxygen diffusion, in the presence of humidity.

Figures 3, 4A, 4B:
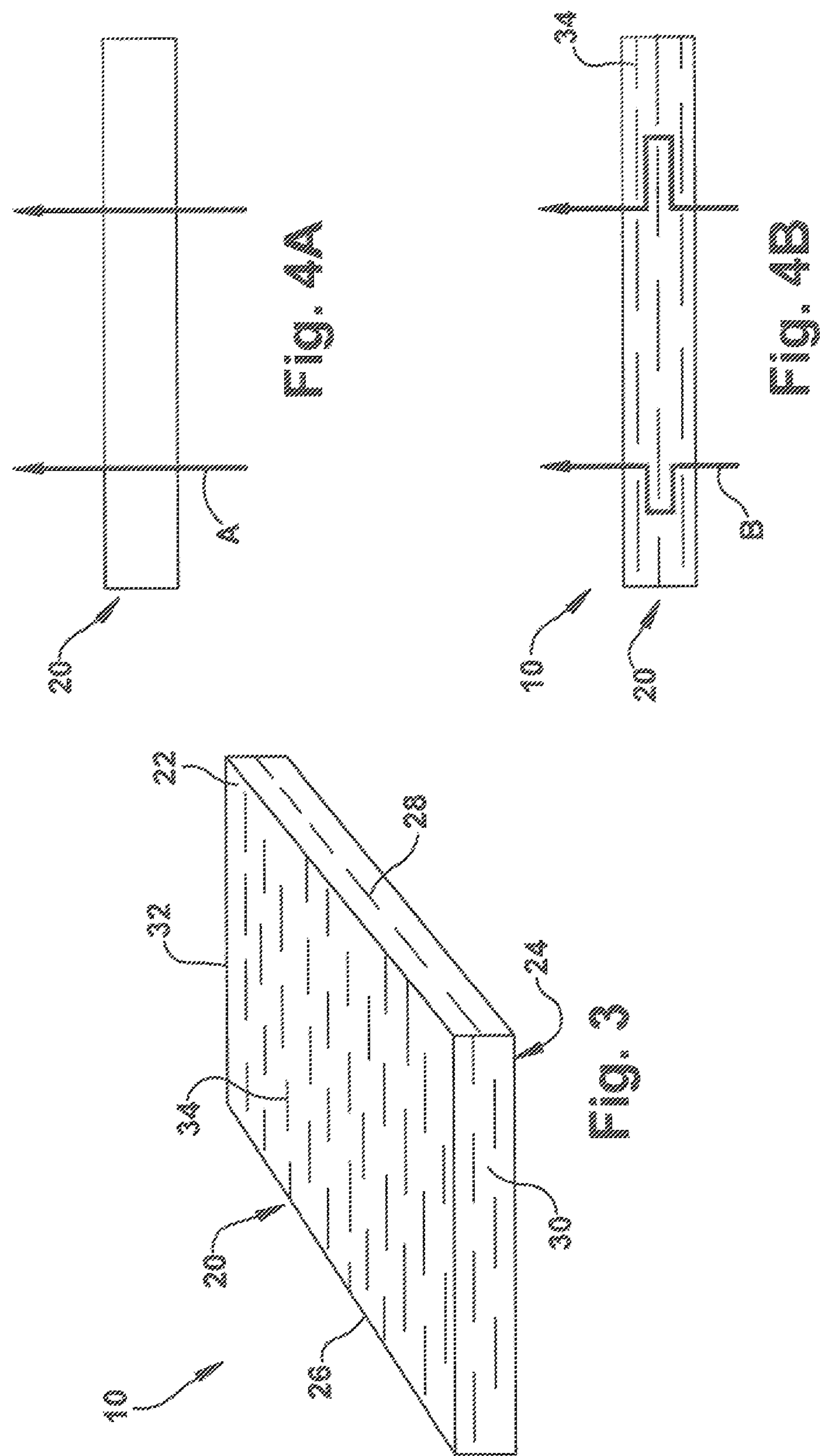
FIG. 3 is a schematic illustration of a barrier structure in accordance with an embodiment of the present invention.
FIG. 4A is a side elevational view of a polymer matrix in accordance with the present invention.
FIG. 4B is a side elevational view of a composite film in accordance with the present invention.

FIG. 3 is a schematic illustration of a barrier structure in accordance with an embodiment of the present invention. The barrier structure comprises a composite film 10 that includes a polymer matrix 20 and a plurality of glass particles 34 dispersed within the polymer matrix.

The polymer matrix 20 has a generally rectangular or square shape and includes a top surface 22 and a substantially parallel bottom surface 24 spaced apart from the top surface. A first side 26 and second side 28 connect the top surface 22 to the bottom surface 24. The first and second sides 26 and 28 extend generally parallel to one another. The composite film 10 further includes front and rear surface 30 and 32, which connect the first side 26 to the second side 28. The front and rear surfaces 30 and 32 extend generally parallel to one another.

The glass particles 34 may exhibit any configuration within the polymer matrix 20 that inhibits the diffusion of gas through the composite film 10 from the bottom surface 24 to the top surface 22. One such configuration is illustrated in FIG. 3 in which the glass particles 34 are elongated to exhibit disc or platelet shapes and extend substantially parallel to the top surface 22 and the bottom surface 24 of the polymer matrix 20. This glass particle platelet morphology may not only improve barrier properties but may also lead to a significant improvement in mechanical properties.

The barrier structure 10 can be formed by dispersing glass particles 34 within the polymer matrix 20 by any conventional means. For example, the glass particles 34 can be substantially spherical balls that are melt blended by co-extrusion into the polymer matrix 20 to form the composite film 10. Alternatively, the glass particles 34 can be injection molded with the polymer matrix 20 to form the composite film 10. The glass particles 34 may be randomly dispersed or dispersed in a predetermined fashion throughout the polymer matrix 20.

Once the glass particles 34 are dispersed within the polymer matrix 20, the sheet of composite film 10 is compressed and biaxially oriented. This causes the substantially spherical glass particles to deform into aligned high aspect ratio platelet shaped elements within the polymer matrix 20. This deformation of the glass particles 34 helps to provide the composite film 10 with barrier properties.

As illustrative of these barrier properties, a comparison between the diffusion properties of a homogenous polymer matrix 20 and the composite film 10 is illustrated in FIGS. 4A-B. As indicated by arrow A in FIG. 4A, gas diffusion through the polymer matrix 20 alone is relatively unimpeded. The diffusion path is relatively straight due to the porosity of the polymer matrix 20.

The elongated glass particles 34 dispersed in the polymeric matrix 20 of the present invention, however, impede the diffusion path of the gas and, thus, inhibit diffusion of the gas through the composite film 10. By dispersing the glass particles 34 throughout the polymer matrix 20, the high aspect ratio of the glass particles forces the gas to diffuse through a more tortuous path, indicated at B in FIG. 4B. This tortuous diffusion path slows the diffusion rate of the gas through the composite film 10 and therefore enhances barrier performance.

Figure 6:
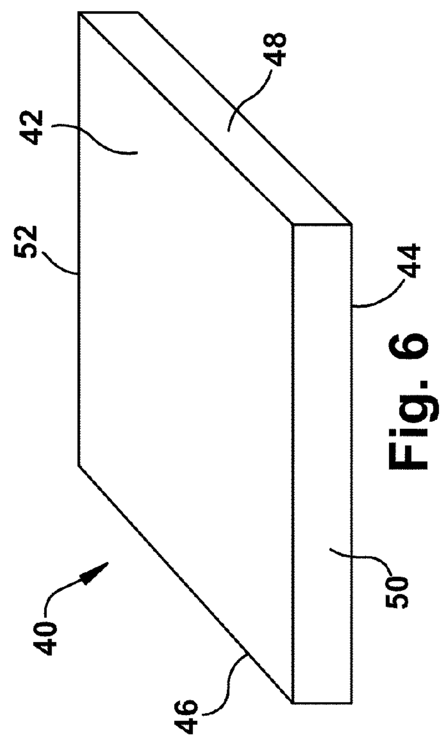
FIG. 6 is a schematic illustration of a polymer layer of the barrier structure of FIG. 3.
Figure 5:
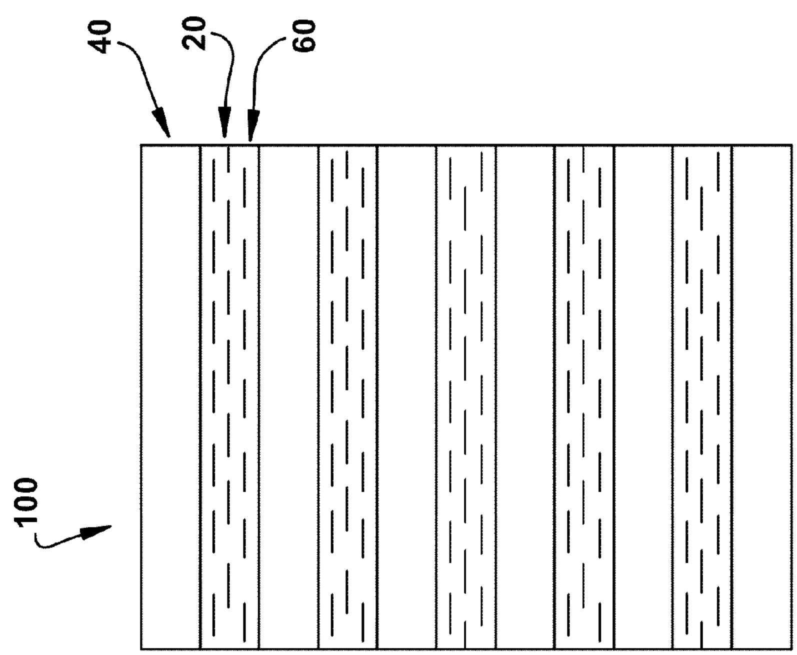
FIG. 5 is a schematic illustration of a barrier structure in accordance with a second embodiment of the present invention.

In accordance with another embodiment of the present invention, illustrated in FIGS. 5-6, the barrier structure 100 may comprise an alternating stack of composite layers 60 and polymer layers 40. The composite layer 60 may include the composite film 20.

The polymer layers 40 have a similar construction to the composite film 10. The polymer layers 40 may each have generally rectangular or square shape and comprises a top surface 42 and a substantially parallel bottom surface 44 spaced apart from the top surface. A first side 46 and second side 48 connect the top surface 42 to the bottom surface 44. The first and second sides 46 and 48 extend generally parallel to one another. The polymer layers 40 further include front and rear surface 50 and 52, which connect the first side 46 to the second side 48. The front and rear surfaces 50 and 52 extend generally parallel to one another.

The polymer layers 40 and composite layers 60 are stacked in an alternating fashion to achieve a desired thickness for the particular application. Although a total of eleven layers are illustrated in FIG. 5, any number of alternating layers can be utilized within the spirit of the invention, including a single layer or several thousand layers. Furthermore, the first, or bottom, layer of the alternating stack may be a polymer layer 40 or a composite layer 60. Likewise, the last, or top, layer of the alternating stack may be a polymer layer 40 or a composite layer 60.

When the polymer layers 40 and composite layers 60 are stacked, the top surface 22 of the composite film 10 of each composite layer abuts the bottom surface 44 of a polymer layer. Likewise, the top surface 42 of each polymer layer 40 abuts the bottom surface 24 of the composite film 10 of a composite layer 60. Thus, the polymer layers 40 and the composite layers 60 are substantially parallel to one another in the stack.

Although the stacked barrier structure 100 is described as being a single melt of polymer layers 40 and composite layers 60, those in the art will appreciate that the barrier structure 100 could likewise be formed in a piecewise fashion in which each individual polymer layer and composite layer is individually formed and stacked to form the alternating stack illustrated in FIG. 5.

By adjusting the number of layers 40, 60 in the barrier structure 100 and the dispersion of the glass particles 34 within the composite film 20, the diffusion properties of the barrier structure can be tailored to meet a wide range of applications and specifications.

Figure 7:
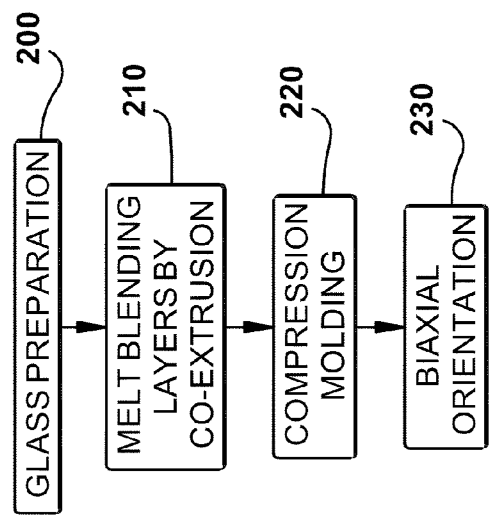
FIG. 7 is a flow chart illustrating a method of forming a barrier structure in accordance with an embodiment of the present invention.

A method of forming the barrier structure 100 is illustrated in FIG. 7. In the first step 200, the glass composition is prepared. This may comprise either a layer of glass only or the glass/polymer composite film previously described. At step 210, the glass/composite layer is melt blended via co-extrusion with a polymer layer. At step 220, the blended mixture of glass and polymer is compression molded into a sheet or strip. At step 230, the mold is biaxially oriented such that the glass particles are deformed into aligned high aspect ratio platelets to inhibit gas diffusion through the barrier structure.

EXAMPLE 1

In this example, four varying constructions of batch glass (Pglass) compositions were investigated. As shown in Table 2, the amount of SnO in the batched material directly affects the $T_g$ of the Pglass. In particular, the $T_g$ of the Pglass decreases as the amount of SnO in the batched amount decreases.

TABLE 2

Batch glass compositions in mol % and properties (batch size approx. 25 g)

| | P glass 1 | P glass 2 | P glass 3 | P glass 4 | P glass 5 |
|---|---|---|---|---|---|
| $P_2O_5$ | 30 | 35 | 40 | 30 | 30 |
| SnO | 20 | 15 | 10 | 15 | 10 |
| $SnF_2$ | 50 | 50 | 50 | 55 | 60 |
| Measured $T_g$ (° C.) | 118 ± 2 | 110 ± 2 | 98 ± 2 | 112 ± 2 | 105 ± 2 |

TABLE 2-continued

| Batch glass compositions in mol % and properties (batch size approx. 25 g) | | | | | |
|---|---|---|---|---|---|
| | P glass 1 | P glass 2 | P glass 3 | P glass 4 | P glass 5 |
| Density ($g/cm^3$) | 3.65 ± 0.01 | 3.30 ± 0.01 | 3.12 ± 0.01 | 3.62 ± 0.01 | 3.60 ± 0.01 |
| Synthesis temp. (° C.) | 450 | 450 | 450 | 450 | 450 |
| Synthesis time (mins) | 15 | 15 | 15 | 15 | 15 |
| Observation | Clear glass | Clear glass | Clear glass | Clear glass | Clear glass |

The poly(propylene-graft-maleic anhydride) PPgMA grade PB 3002 was provided by Chemtura® Corp. The density and melt flow index (MFI) were 0.91 g cm-3 and 7 g (10 min)-1 (ASTM D 1238), respectively. The polypropylene (PP) grade ZN5D98 was provided by the Dow Chemical Company®. The density and melt flow index (MFI) were 0.9 g $cm^{-3}$ and 3.4 g $(10\ min)^{-1}$ (ASTM D 1238), respectively. Glasses were prepared from reagent grade tin fluoride ($SnF_2$), tin oxide (SnO), and ammonium dihydrogen phosphate ($NH_4H_2PO_4$) all purchased from Aldrich® and used as received.

Glass Preparation

The phosphate glasses (Pglass) were prepared on a 250 g scale. The ingredients were carefully weighed and added into a closed jar to form Pglass with a batch molar composition of 50% $SnF_2$+20% SnO+30% $P_2O_5$. The ingredients were tumble mixed for 25-30 minutes to produce a uniform mixture and then transferred to a 300 ml capacity vitreous carbon crucible. The crucible was placed, uncovered, into a muffle furnace at 450° C. for 70 minutes. Fluid melts obtained using this procedure were quenched onto a stainless steel plate and annealed by placing in the oven at approximately 20° C. above the $T_g$ for about 90 minutes. This results in a Pglass with a density of 3.65±0.01 g $cm^{-3}$ and a $T_g$ of 118±2° C.

Composite Preparation

The composites containing 6, 10, and 20 volume % Pglass were prepared using a Thermo-Haake Rheomix 3000 batch mixer equipped with roller rotors. The polymer and Pglass were batch mixed at 210° C. at a rotor speed of 60 rpm for 8 minutes, then collected as pieces about 2 mm thick and 100 mm×100 mm across. The polymer was dried in a vacuum oven at 100° C. for at least 24 h prior to melt blending. The Pglass used was a fine powder ground using an IKA M20 mill and stored in a desiccator before use in order to prevent any moisture absorption. Ground Pglass, when exposed to atmosphere for a couple of days under normal laboratory temperature and humidity absorbs moisture reversibly. The $T_g$ drops as much as 100-20° C., however, drying the glass under vacuum at temperature above its $T_g$ brings the $T_g$ to its original value.

Film Preparation

Films approximately 0.25 mm thick were prepared by compression molding the composite material between two steel plates covered with Kapton® polyimide films in a Carver press at 210°C., 5 min residence time at 5000 psi pressure. The films were quenched by placing between two platens after removal from the press. The films were stored in a desiccator to prevent any water absorbtion.

Biaxial Orientation

Square specimens 85 mm×85 mm were cut from the compression-molded sheets, marked with a grid pattern, and biaxially stretched in a Brückner Karo IV biaxial stretcher at 155° C. at engineering strain rates of 400% $s^{-1}$ and 5% $s^{-1}$ based on the original specimen dimensions. The preheat time before stretching was fixed at 1 min. The sheets were simultaneously and equi-biaxially drawn to draw ratios varying from 3:3 to 5:5. The uniformity of the drawn specimens was determined from the even deformation of the grid pattern.

In order to analyze the morphology of the composite materials before and after biaxial orientation, the films were embedded in epoxy and microtomed at room temperature using a glass knife. The samples were sputter coated with palladium. The morphology was observed using a Philips XL scanning electron microscope (SEM). SEM images were analyzed using Image-Pro Plus software in order to estimate the average diameter of the dispersed Pglass droplet. Three different images were analyzed for each composition and the values were averaged to obtain the reported results.

Oxygen Permeability

Oxygen flux J(t) at 0% relative humidity, 1 atm and 23° C. was measured with a MOCON OX-TRAN 2/20. The permeant gas stream was diluted with nitrogen to achieve a 2% oxygen concentration in order to avoid exceeding the detector capability of the instrument. Permeability was obtained from the steady flux Jo according to $$P=J_o l/p \quad (1)$$

where p is the oxygen pressure and l is the film thickness. Two films prepared under the same conditions were tested to obtain the average permeability. The permeability can be split into the solubility (S) and diffusivity (D). Usually D and S are extracted from the non-steady state flux curve. In this study, the films after biaxial orientation were 5-8 μm thick and the steady state was achieved very rapidly.

Density Measurements

The density was measured at room temperature according to ASTM D1501-85. A 2-proponal/water gradient column with a range of 0.85-0.95 g $cm^{-3}$ and two different calcium nitrate/water columns having a range of 1.05-1.20 g $cm^{-3}$ and 1.30-1.46 g $cm^{-3}$ were prepared and calibrated with glass floats of known density. Small pieces of film (~5×5 $mm^2$) were placed in the column and measurements were taken after 10-12 h equilibration. At least 3 pieces from each film were tested. Densities of the prepared glasses were measured using Archimedes method and deionized water as the immersion fluid.

Mechanical Properties

Mechanical properties of the composite materials were evaluated in uniaxial tension on an Instron 5565 universal tester. Film samples were punched into dog bone shape using an ASTM-D638V punch tool and tested at room temperature at a strain rate of 10%/min. Three samples were tested for each composition and the values were averaged to obtain the reported results.

Results and Discussion

Phosphate glasses containing 10-20 mol % SnO were prepared in 25 g batches using vitreous carbon crucible by melting for 15 min at 450° C. The batch compositions for these materials are listed in Table 2 along with their appearances.

Pglass produced with a batch molar composition of 50% $SnF_2$+20% SnO+30% $P_2O_5$ has been shown to have sufficiently high chemical durability and has been successfully melt blended with a variety of different organic polymers. Similar observations were made in our limited study with these glasses. Hence, for our study, this particular composition was chosen for scaling up the synthesis and the synthesis procedure is given in experimental section.

Composites were prepared by melt mixing ground Pglass with two different organic thermoplastic polymers, PP and PPgMA. The properties of polymer blends are usually controlled by the properties of the components, the morphology of the blends, and the interaction between components in the blends. The domain size is often used to indicate the extent of compatibility of multiphase polymer systems, i.e., the smaller the domain size, the more compatible the systems are and the better the mechanical properties. The hydrogen bonding between the hydroxyl groups on the glass surface and the maleic anhydride group in PPgMA is believed to be the reason for improved interfacial adhesion. The discussion, which follows, will be limited to composites of PPgMA and Pglass.

The Pglass was dispersed as spherical droplets in the polymer matrix after melt mixing. The SEM images were analyzed using image analysis software in order to estimate the average diameter of the dispersed droplet phase in the composites. The average particle size increased slightly with increasing volume % Pglass from 2.1±1.0, to 2.2±0.8 to 2.5±1.3 mm for the 94/6, 90/10, and 80/20 v/v composites, respectively.

Biaxial Orientation

Thermograms of the compression molded PPgMA and PPgMA/Pglass films showed a gradual onset of melting at about 140° C. and the peak melting temperature at 166° C. At 155° C., the temperature used to perform the stretching, the films were partially melted. Stretching at lower temperatures resulted in void formation in the case of composite films. With increasing temperature, the stress response decreased as more crystals melted. An optimum balance in stress response and orientation was achieved for the composites at 155° C. The film was preheated at 155° C. for 60 s and stretched at a strain rate of 400% $s^{-1}$ or 5% $s^{-1}$. A grid pattern was marked on the sheet before stretching in order to determine the uniformity of the deformation and to obtain an accurate measure of the draw ratio. The draw ratio in the two orthogonal directions was calculated from the change in separation of the parallel grid lines. The area draw ratio $A/A_o$ was also obtained, where $A_o$ is the initial area defined by the grid lines and A is the area defined by the same grid lines after stretching.

For the films stretched at 400% $s^{-1}$, the biaxial draw ratio in the center region of the stretched film was very uniform as indicated by straight, parallel grid lines, and was close to the target draw ratio, as shown in Table 3.

TABLE 3

Draw ratio and strain rates for neat PPgMA films biaxially oriented at 155° C.

| Strain rate ($s^{-1}$) | Targeted draw ratio | Measured draw ratio (approx.) | $A/A_o$ |
|---|---|---|---|
| 400 | 3 × 3 | 3.8 × 3.8 | 14.5 |
| 400 | 4 × 4 | 5.0 × 5.0 | 25.0 |
| 400 | 5 × 5 | 5.6 × 6.0 | 33.6 |
| 5 | 3 × 3 | 5.5 × 6.0 | 33.0 |
| 5 | 4 × 4 | 7.2 × 8.0 | 57.6 |
| 5 | 5 × 5 | 8.5 × 8.5 | 70.0 |

However, examination of the films revealed that the glass particles debonded from the matrix and were not deformed during the stretching process. In the case of films stretched at 5% $s^1$, the measured draw ratio in the center region of the film was substantially higher than the target draw ratio. It was thought that uniformity was affected by uneven heating. Especially with an unusually low stretch rate, a slightly higher temperature in the center of the stretching chamber could result in uneven drawing.

Figure 8:
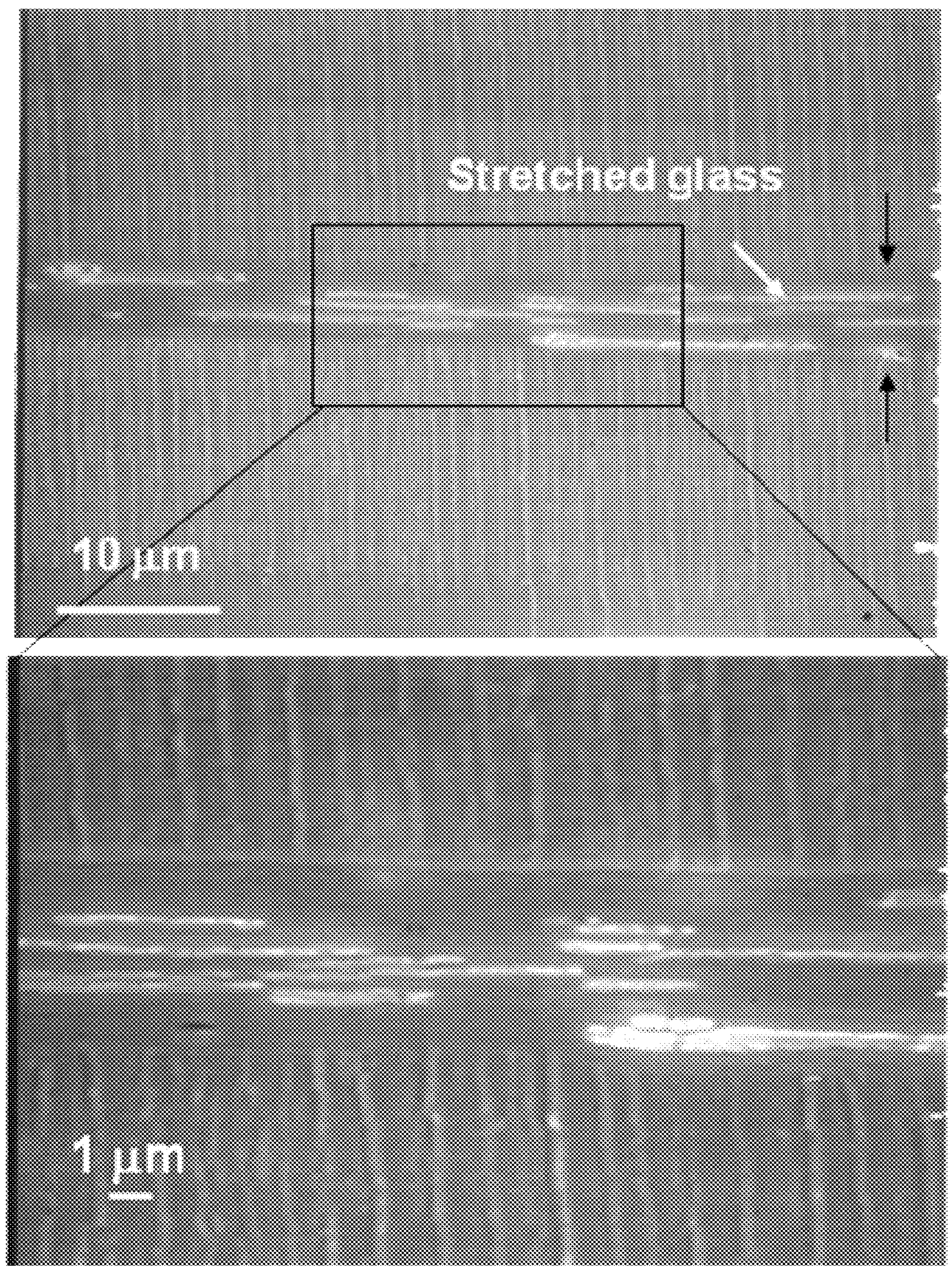
FIG. 8 is an SEM image of a composite film having 10% by volume glass after biaxial orientation.

Specimens were cut from the center region of the films for further characterization. The SEM images confirmed that biaxial stretching of the compression-molded films at a strain rate of 5% $s^{-1}$ deformed the dispersed Pglass spheres into high aspect ratio platelets. The example in FIG. 8 shows the 90/10 v/v composite stretched to a target draw ratio of 4:4. Adhesion between the PPgMA matrix and the dispersed Pglass particles was good enough that stress transfer to the dispersed spheres transformed them into high aspect ratio platelets. The platelet volume appeared to be considerably larger than the initial particle volume suggesting that the Pglass particles coalesced during stretching.

Oxygen Permeability

Various models are used to describe the gas permeability of composite materials. It was anticipated that the permeability P of the compression-molded films would be described by the Maxwell model for randomly dispersed spherical particles $$\frac{P}{P_m} = 1 + \frac{3\phi_{Pglass}}{\left[\frac{(P_{Pglass}/P_m)+2}{(P_{Pglass}/P_m)-1}\right] - \phi_{Pglass}} \tag{2}$$

where $P_{Pglass}$ and $P_m$ are the permeabilities of the dispersed Pglass particles and the PPgMA matrix, respectively, and $\phi_{Pglass}$ is the volume fraction of Pglass. If the particles are platelet-shaped with aspect ratio α and oriented parallel to the polymer film surface, i.e., perpendicular to the permeation direction as in the biaxially stretched films, appropriate permeability models include those of Nielson $$\frac{P}{P_m} = \frac{1-\phi_{Pglass}}{1+\alpha\frac{\phi_{Pglass}}{2}} \tag{3}$$

or Cussler et al.

$$\frac{P}{P_m} = \frac{1-\phi_{Pglass}}{1+\left(\alpha\frac{\phi_{Pglass}}{2}\right)^2} \tag{4}$$

The oxygen permeability data are summarized in Table 4. The decrease in P of PPgMA with increasing area draw ratio was consistent with previous reports for biaxially stretched isotactic PP. The presence of spherical Pglass particles in the unstretched composite decreased the permeability somewhat. The dependence of P on Pglass content was satisfactorily described by Eq. (2). Transformation of the spherical Pglass particles into platelets by biaxial stretching to a target draw ratio of 3:3 remarkably decreased the permeability. However, stretching to a higher target draw ratio resulted in some increase in the permeability, possibly due to breakup of the Pglass platelets and a reduction in the aspect ratio.

TABLE 4

Oxygen permeability of biaxially oriented PPgMA and PPgMA/Pglass composites

| Sample | P ($O_2$) (barrer) | | | | Improvement in barrier | | | |
|---|---|---|---|---|---|---|---|---|
| | 1 × 1 | 3 × 3 | 4 × 4 | 5 × 5 | 1 × 1 | 3 × 3 | 4 × 4 | 5 × 5 |
| PPgMA | 0.90 ± 0.04 | 0.65 ± 0.03 | 0.57 ± 0.02 | 0.53 ± 0.02 | | | | |
| PPgMA/Pglass 94/6 v/v | 0.80 ± 0.03 | 0.20 ± 0.02 | 0.25 ± 0.03 | 0.40 ± 0.04 | 1.1× | 3× | 2× | 1.5× |
| PPgMA/Pglass 90/10 v/v | 0.75 ± 0.03 | 0.11 ± 0.02 | 0.15 ± 0.02 | 0.31 ± 0.07 | 1.2× | 6× | 4× | 1.8× |
| PPgMA/Pglass 80/20 v/v | 0.65 ± 0.03 | 0.009 ± 0.004 | 0.02 ± 0.004 | 0.09 ± 0.01 | 1.4× | 75× | 30× | 6× |

The permeability data for the stretched films were fit to the Nielsen model using the aspect ratio a as the only fitting parameter. Eq. (3) satisfactorily described the results for the lower Pglass loadings (96/6 and 90/10 v/v) with particle aspect ratios α of 80, 45, and 15 for target draw ratios of 3:3, 4:4 and 5:5, respectively. On the other hand, P of the composite with the highest Pglass content (80/20 v/v) was considerably lower than the prediction from Eq. (3) for all draw ratios. When the results for these films were compared against the prediction from Eq. (4) using the aspect ratios extracted from the Nielsen analysis, good agreement was obtained. It would seem that composites with 10 volume % Pglass or less fell in the dilute regime whereas 20 volume % Pglass was high enough to put the composite in the semidilute regime. The aspect ratios obtained by fitting the data were consistent with the platelet dimensions observed in the SEM images.

It is possible to calculate a platelet draw ratio using volume conservation and assuming that the spherical domains deform affinely into circular disks. From volume conservation $$\frac{4}{3}\pi r^3 = \pi(\lambda r)^2 W \quad (5)$$

then $$\alpha = \frac{L}{W} = \frac{2\lambda r}{W} = \frac{3}{2}\lambda^3 \quad (6)$$

where r is the radius of the spherical domains, λ is the balanced biaxial draw ratio, and L and W are the length and thickness of the circular disk, respectively. The aspect ratios calculated from Eq. (6) using the measured draw ratios in Table 4 were substantially higher than the effective values obtained from the permeability results for all the composites.

It was readily apparent that biaxial stretching transformed spherical Pglass particles into impermeable platelets that imparted dramatically reduced oxygen permeability. However, the model calculations suggested that even greater reductions were possible. Non-affine deformation of the Pglass particles due to viscosity differences or poor adhesion, or breakup into lower aspect ratio platelets, could have compromised the results. Alternatively, void formation during stretching might have had a role. This possibility was tested with density measurements shown in Table 5.

TABLE 5

Density values of biaxially oriented films drawn to various targeted draw ratios

| | Quenched | Annealed | 3 × 3 | 4 × 4 | 5 × 5 |
|---|---|---|---|---|---|
| PPgMA | 0.9025 ± 0.0005 | 0.9145 ± 0.0005 | 0.9137 ± 0.0005 | 0.9130 ± 0.0005 | 0.9115 ± 0.005 |
| PPgMA/Pglass 94/6 v/v | 1.070 ± 0.001 | 1.079 ± 0.001 | 1.071 ± 0.001 | 1.068 ± 0.005 | 1.055 ± 0.007 |
| PPgMA/Pglass 90/10 v/v | 1.162 ± 0.001 | 1.174 ± 0.001 | 1.168 ± 0.001 | 1.165 ± 0.005 | 1.158 ± 0.007 |
| PPgMA/Pglass 80/20 v/v | 1.431 ± 0.001 | 1.445 ± 0.001 | 1.424 ± 0.001 | 1.39 ± 0.01 | 1.32 ± 0.02 |

In this case, the stretched samples were compared with an unstretched control that was annealed at the stretch temperature for 60 s. The decrease in density of PPgMA with increasing draw ratio was observed previously with biaxially stretched isotactic PP and was attributed to reduced crystallinity. It should be recalled that the films were partially melted during the preheat period and they remained partially melted during the stretching process. Recrystallization during cooling was inhibited by orientation of the amorphous tie chains.

The density of the Pglass composites also decreased systematically with draw ratio. The decrease in density in the biaxially oriented composite films was more pronounced than in neat PPgMA suggesting that the Pglass platelets restricted the crystallization of the polymer matrix quite significantly. The density of the PPgMA in the biaxially oriented composites can be calculated according to $$\rho PPgMA = \frac{\rho_c - \Phi_{Pglass}\rho_{Pglass}}{1 - \Phi_{Pglass}}$$

where $\rho_c$ is the density of the composite, $\Phi_{Pglass}$ is the volume fraction of Pglass and $\rho_{Pglass}$ is the density of the Pglass. The results are given in Table 6.

TABLE 6

PPgMA density values in biaxially oriented composite films drawn to various draw ratios

| | Quenched | Annealed | 3 × 3 | 4 × 4 | 5 × 5 |
|---|---|---|---|---|---|
| PPgMA | 0.9025 | 0.9145 | 0.9137 | 0.9130 | 0.9115 |
| PPgMA/Pglass 94/6 v/v | 0.9053 | 0.9148 | 0.9063 | 0.9031 | 0.8893 |
| PPgMA/Pglass 90/10 v/v | 0.8917 | 0.9050 | 0.8983 | 0.8950 | 0.8872 |
| PPgMA/Pglass 80/20 v/v | 0.8969 | 0.9142 | 0.8882 | 0.8460 | 0.7591 |

For the 94/6 and 90/10 v/v composites, the calculated density of the PPgMA phase decreased systematically with increasing glass content and with increasing draw ratio, but in all cases was substantially higher than the amorphous phase density of PP ($\rho a=0.853$ g $cm^{-3}$). This was consistent with the hypothesis that the glass phase constrained crystallization of the PPgMA. Although cavitation may have been insignificant in the 94/6 and 90/10 films, it appeared to be substantial in the stretched 80/20 films. In the 80/20 v/v composite films biaxially oriented to targeted drawratios of 4:4 and 5:5, the calculated density of the PPgMA phase was much lower than for the other composite films and indeed was less than the amorphous phase density of PP. At least in these cases, it appeared that cavitation had occurred and was at least one reason that full realization of the gas barrier potential of these composites was not realized. The thickness of the films restricted our ability to carry out DSC and verify any changes in percent crystallinity.

Mechanical Properties

Figure 9:
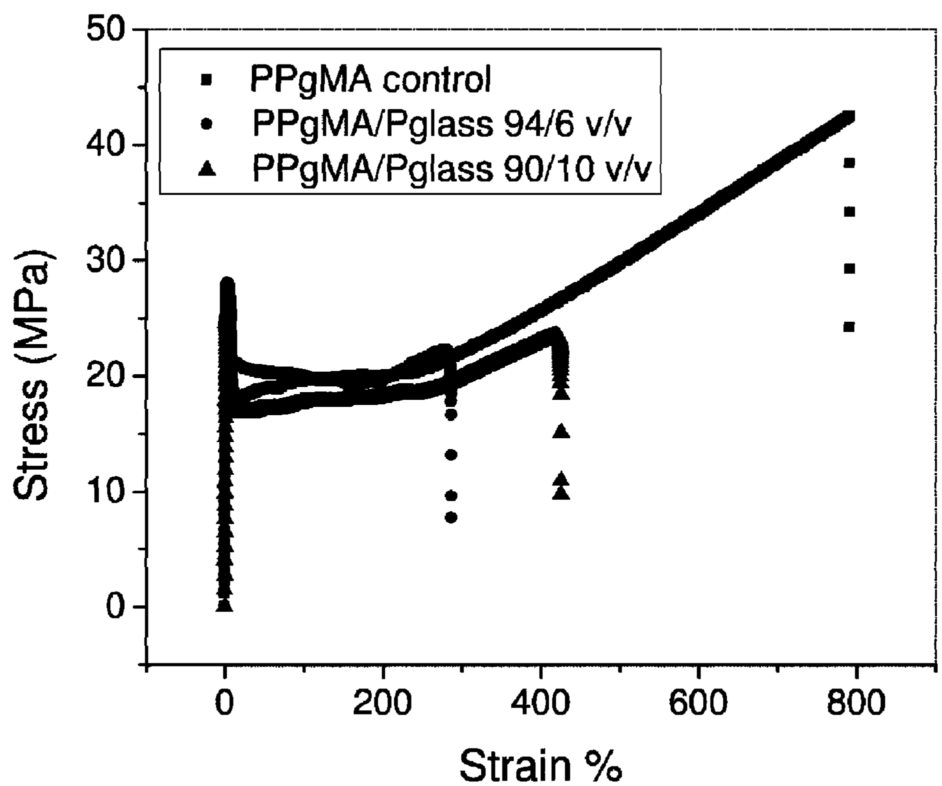
FIG. 9 is a graph illustrating stress-strain behavior for compression molded PPgMA/Pglass composite films.
Figure 9:
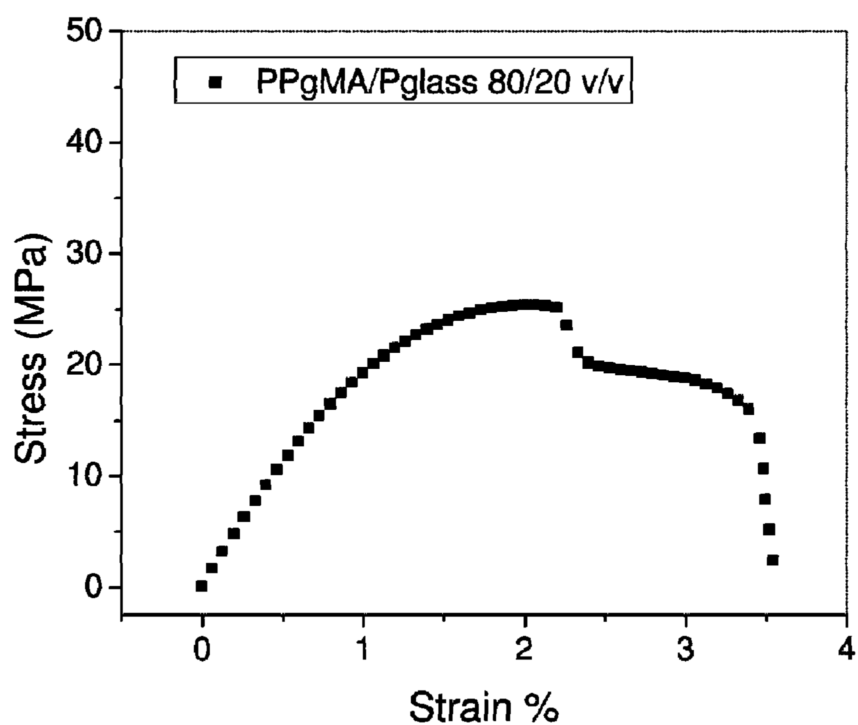

FIG. 9 shows the typical stress-strain behavior for the compression molded PPgMA/Pglass composite films studied. Composites with up to 10 volume % Pglass showed ductile behavior with formation of a stable neck. Deformation occurred by uniform extension of the entire gauge section. A drop in the elongation at break and fracture stress was observed with the incorporation of up to 10 volume % Pglass in the composites as compared to the neat PPgMA. The stress-strain behavior of composites with 20 volume % Pglass began to resemble that of brittle solids with significant drop in elongation at break. Debonding occurs at yielding between the glass particles and polymer matrix. Increasing the Pglass concentration to 20 volume % lead to formation of narrow craze-like deformation zones causing it to fail in a quasi brittle manner. The modulus of the composite films increased almost linearly with the addition of Pglass and took values up to 50% higher than that of neat PPgMA as shown in Table 7.

TABLE 7

Summary of tensile properties of unoriented neat PPgMA and PPgMA/Pglass composites

| | Modulus (GPa) | Yield stress (MPa) | Fracture stress (MPa)[a] | Elongation at break (%) |
|---|---|---|---|---|
| PPgMA | 1.45 ± 0.02 | 27.6 ± 0.4 | 43.0 ± 1.0 | 800 ± 40 |
| PPgMA/Pglass 94/6 v/v | 1.62 ± 0.03 | 28.4 ± 0.04 | 23.0 ± 1.0 | 300 ± 20 |
| PPgMA/Pglass 90/10 v/v | 1.75 ± 0.03 | 26.0 ± 1.0 | 26.0 ± 3.0 | 350 ± 60 |
| PPgMA/Pglass 80/20 v/v | 2.15 ± 0.10 | 24.8 ± 2.0 | 23.0 ± 3.0 | 5 ± 2 |

The stress-strain behavior of the biaxially oriented PPgMA/Pglass composite films was also studied. The modulus and elongation at break values for the biaxially oriented composite films drawn to 3:3 as shown in Table 8. The modulus of the neat PPgMA increased from 1.45 GPa to 2.6 GPa. The significant improvement in the modulus was attributed to the orientation of the polymer chains during the biaxial orientation process. The modulus of the composite films also increased by a factor of 1.2-2.0× depending on the volume % of the Pglass in the composite.

TABLE 8

Tensile properties of biaxially oriented neat PPgMA and PPgMA/Pglass composite

| | Modulus (GPa) | Elongation at break (%) |
|---|---|---|
| PPgMA | 2.6 ± 0.03 | 28 ± 2 |
| PPgMA/Pglass 94/6 v/v | 3.1 ± 0.10 | 20 ± 5 |
| PPgMA/Pglass 90/10 v/v | 3.8 ± 0.05 | 20 ± 5 |
| PPgMA/Pglass 80/20 v/v | 4.8 ± 0.10 | 14 ± 2 |

Conclusions

The oxygen barrier of PPgMA was significantly improved by incorporating Pglass as impermeable inclusions. The Pglass, which was dispersed as spherical droplets in the compression-molded films, elongated into high aspect ratio platelets during the stretching process. The largest reduction in oxygen permeability was obtained by stretching a composite with 20 volume % Pglass to a target draw ratio of 3:3. For all the composites, the largest reduction in permeability was obtained by stretching to a target draw ratio of 3:3. Stretching the composites to higher draw ratios resulted in some increase in permeability, which was attributed to breakup of the platelet-shaped particles and possibly to some cavitation that occurred during stretching. The reduced permeability of the biaxially oriented films was described using either the Nielson or Cussler models depending on the volume of the Pglass in the composite. The particle aspect ratio obtained by fitting the experimental data to the various models ranged from 80 for a target draw ratio of 3:3 to 15 for a target draw ratio of 5:5. These results were within the range observed by SEM experiments. The glass platelets imparted a higher modulus to the stretched films while reducing the elongation at break only slightly.

EXAMPLE 2

Microlayering technique was used to create multilayered films of PPgMA alternating with PPgMA/Pglass composites. It has been found that increasing the number of layers in the composite film while keeping the overall film thickness constant is advantageous. In particular, as the number of layers in the composite film increases, the nominal thickness layer must decrease in order to maintain a constant overall film thickness.

Figure 10:
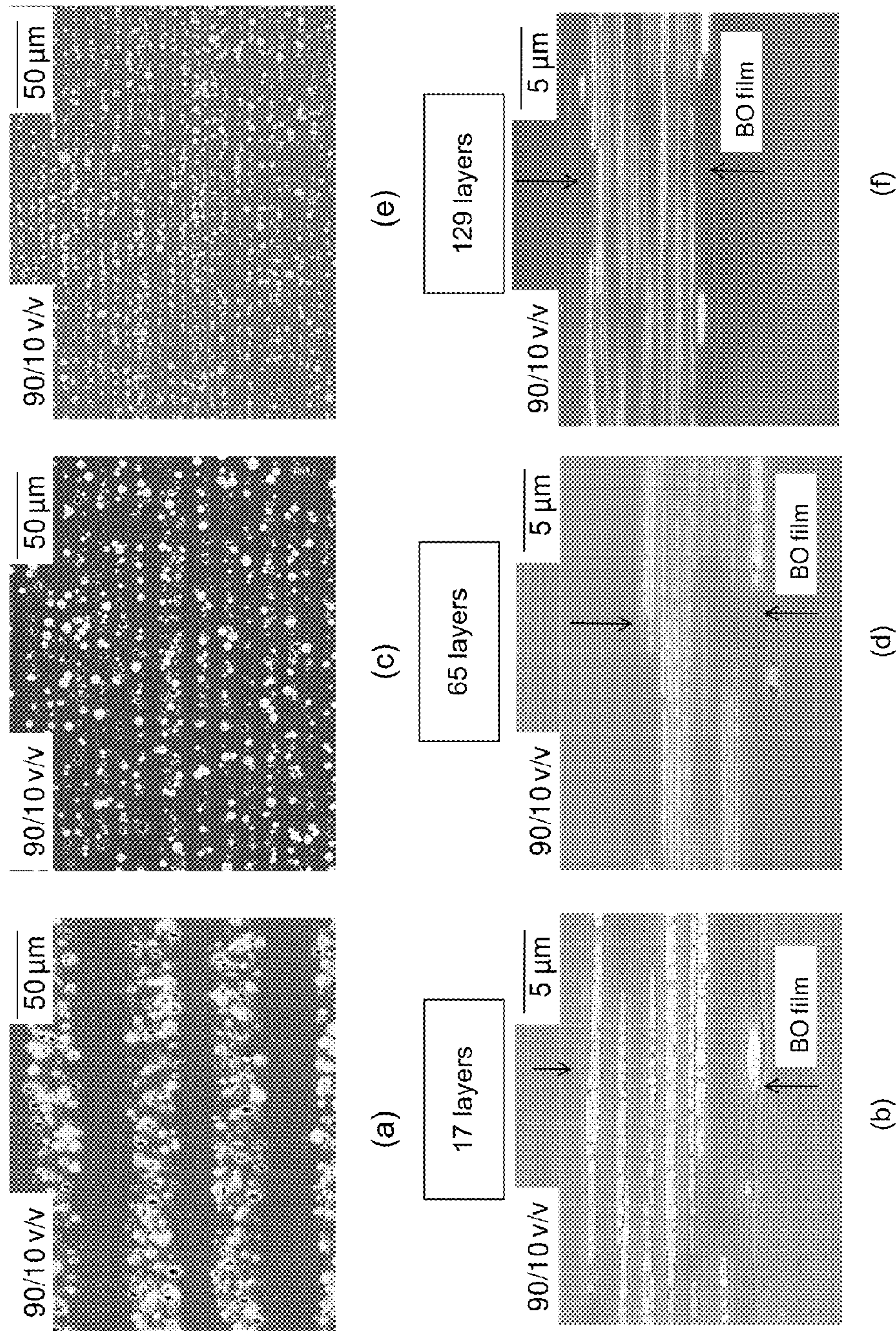
FIG. 10(*a*) is an SEM image of a 17 layer composite film having 10% by volume glass before biaxial orientation.

The deformation of the glass particles from a spherical shape to a disc-like or platelet shape in multilayered composite films having 17, 65, and 129 layers, respectively, is illustrated in FIGS. 10*a*-10*f*. FIG. 10*a* illustrates a 17 layer composite film having 10% by weight of Pglass before biaxial orientation. As shown in FIG. 10*b*, the glass particles are aligned and have a high aspect ratio following biaxial orientation. FIGS. 10*c-d* illustrate a similar transformation in a 65 layer composite film having a Pglass of 10% by weight. Likewise, FIGS. 10*e-f* illustrate the transformation in a 129 layer composite film having a Pglass of 10% by weight.

With the decreasing layer thickness, the Pglass platelets came closer to each other, thereby increasing the tortuosity of the diffusion pathway. Furthermore, as the Pglass concentration increased within the individual layers, the aspect ratio was found to increase, suggesting that the Pglass platelets coalesced during biaxial stretching of the composite film.

Figure 11:
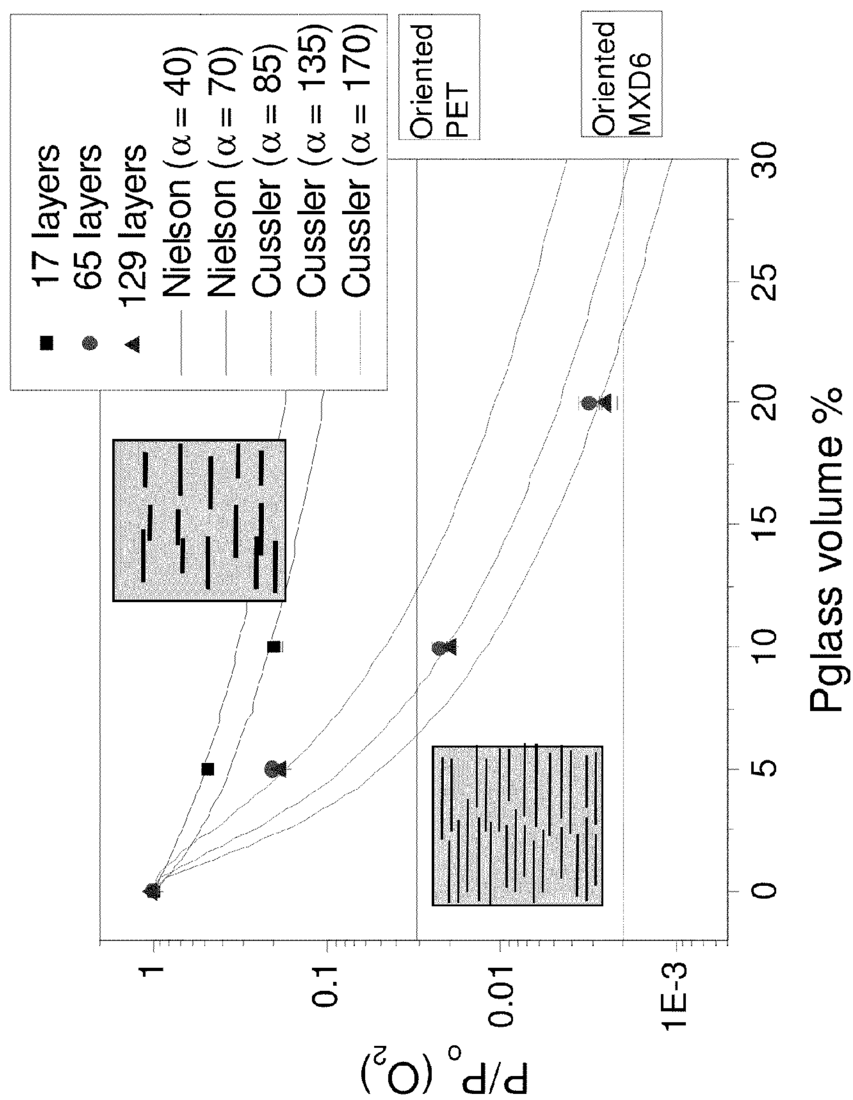
FIG. 11 is a graph illustrating the effect of layering and glass volume content on gas permeability.
Figure 12:
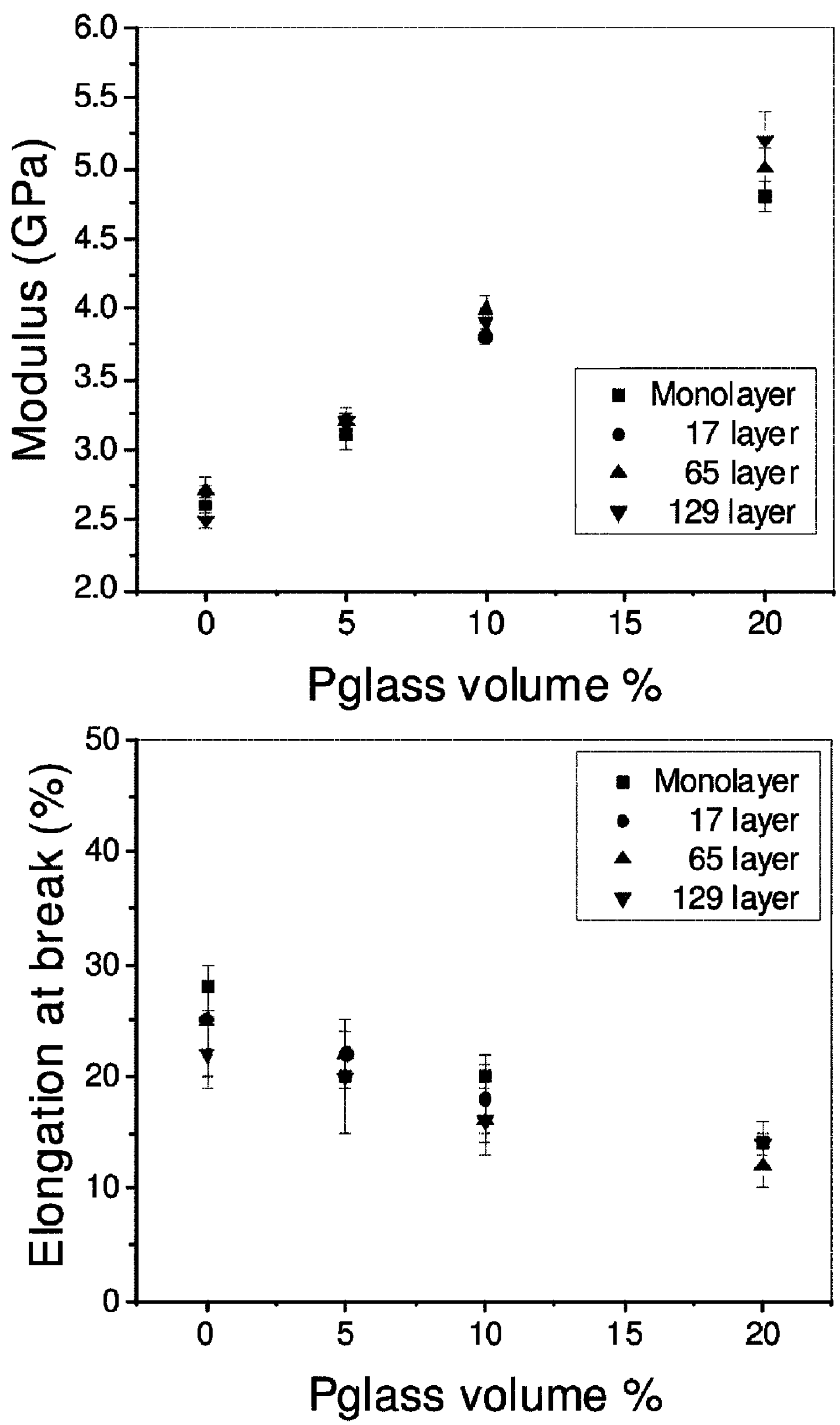
FIG. 12 is a graph illustrating the effect of glass volume content on modulus and elongation.

With 17 layer extrusion (8 layers of glass composite, 9 layers of polymer), 10 volume % glass incorporation brings about a 5× reduction in oxygen permeation vs. the oriented neat PPgMA, achieving ~0.3× the barrier of oriented PET as shown in FIG. 11. The same composition run into 65 layers (32 containing glass) results in a 50× reduction in oxygen permeation vs. the oriented neat PPgMA, and a ~3× reduction in permeation vs. oriented PET. Thus, 10% glass in PP under these conditions allows PP to surpass PET barrier to a point similar to that obtained in commercial PET/MXD6 barrier blends used in beer packaging. When the quantity of glass is doubled to 20 volume % of the total film cross section at 65 layers, a 450× reduction in oxygen permeability vs. the base resin, and about a 20× reduction compared to oriented PET is obtained. FIG. 12 illustrates that the modulus increased by a factor of 1.3-2× depending on the volume % of the Pglass in the monolayer or multilayer composite while maintaining the elongation at break sufficiently high.

EXAMPLE 3

Figure 13:
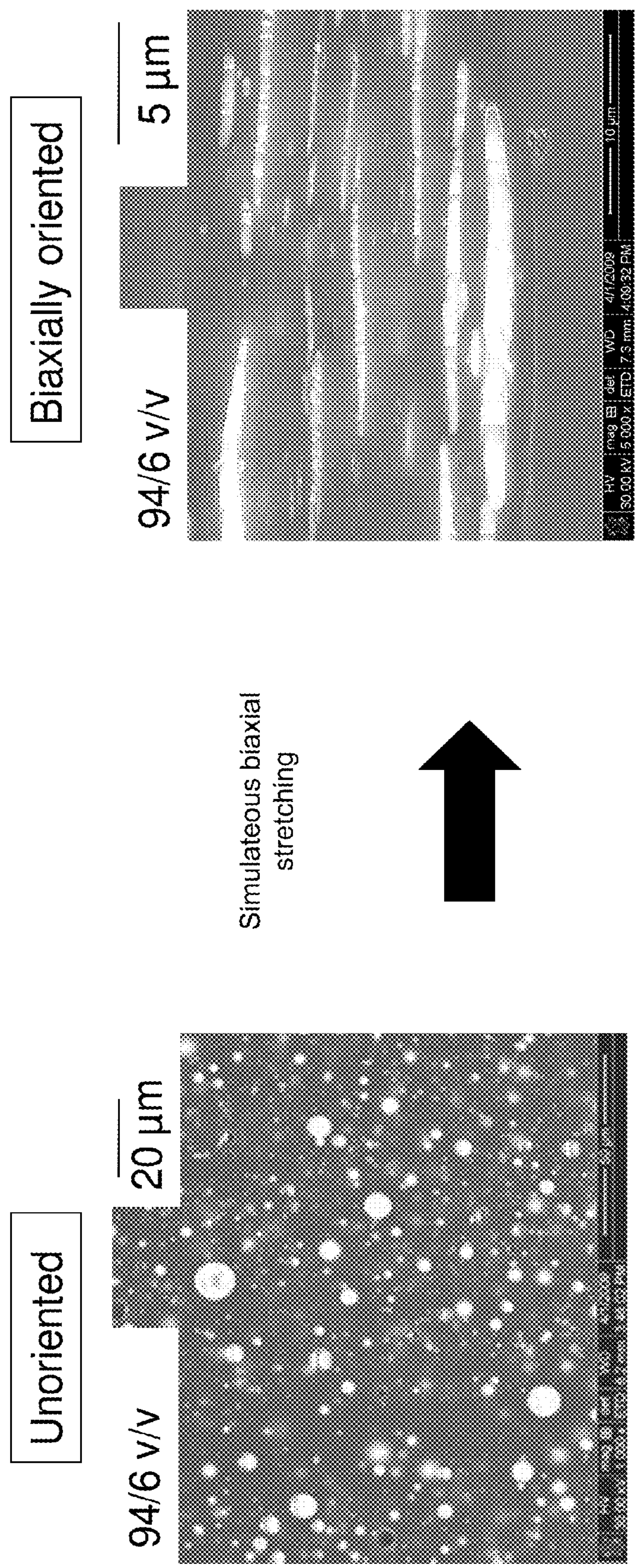
FIG. 13 is an SEM image of a composite film comprising nylon and 10% by volume glass particles.

In this example, a composite film was constructed using a Nylon/Pglass mixture. Semi-crystalline Nylon-Nylon 11 (Polyamide 11), sold under the trade name Rilsan® BESNO TL by Arkemaof Philadelphia, Pa. was mixed in a 94/6 v/v composition with Pglass spheres. The Nylon has a $T_g$=45° C. and $T_m$=189° C. The composite mixture was simultaneously, biaxially stretched at a draw temperature of 150° C. and a strain rate of 5% $s^{-1}$ after a preheat time of 1 min. As shown in FIG. 13, the biaxial orientation of the composite film at 180° C. leads to elongation of the Pglass spheres.

While a preferred embodiment of the invention has been illustrated and described, it shall be understood that the invention is not limited to this embodiment. Numerous modifications, changes and variations will be obvious for those skilled in the art, without departing from the scope of the invention as described by the appended claims. The barrier structure is primarily intended to be used in polymer LED, OLED's, CRT's and LCD's, but it could be used anywhere where excellent barrier properties are needed; FDS, TV, computers, light applications, such as light sources, etc. Moreover, the barrier structure may contain a colouring substance in order to gradually decrease the transparency of the barrier structure, or the inorganic and/or the organic materials may be coloured by themselves.

Further, it may also be possible to manufacture the barrier structure using a wide range of inorganic and organic materials, which give different properties to the final barrier structure. Furthermore, it may be possible to build up a barrier structure with more than one type of polymer and more than one type of glass, which can be made with this co-extrusion technology in a straightforward way. Also, the barrier structure may be made up with several polymers and glasses in various layers in order to build up a barrier structure having different properties in different layers Having described the invention, the following is claimed:

1. A barrier structure comprising alternating stacked composite layers and polymer layers, each of the composite layers having a polymer matrix and a plurality of dispersed glass particles with an aspect ratio of at least 2:1 within the polymer matrix, wherein the glass particles have a glass transition temperature ($T_g$) that is less than the melting temperature ($T_m$) of the polymeric material, and the glass particles inhibit gas diffusion through the composite layers.

2. The barrier structure of claim 1, wherein the glass particles are selected from the group consisting of $P_2O_5$, SnO, $SnF_2$ and combinations thereof.

3. The barrier structure of claim 1, wherein the glass particles comprise about 30% to about 40% $P_2O_5$, about 5% to about 20% SnO, and about 50% to about 60% $SnF_2$.

* * * * *